J. J. FARRELL.
MACHINE FOR ASSORTING AND COUNTING COINS.
APPLICATION FILED FEB. 18, 1913.

1,095,981. Patented May 5, 1914.
6 SHEETS—SHEET 1.

J. J. FARRELL.
MACHINE FOR ASSORTING AND COUNTING COINS.
APPLICATION FILED FEB. 18, 1913.

1,095,981.

Patented May 5, 1914.
6 SHEETS—SHEET 3.

Witnesses

Inventor
John J. Farrell
By A. P. Greeley
Attorney

J. J. FARRELL.
MACHINE FOR ASSORTING AND COUNTING COINS.
APPLICATION FILED FEB. 18, 1913.

1,095,981.

Patented May 5, 1914.

J. J. FARRELL.
MACHINE FOR ASSORTING AND COUNTING COINS.
APPLICATION FILED FEB. 18, 1913.

1,095,981.

Patented May 5, 1914.
6 SHEETS—SHEET 6.

Witnesses:
Parker Cook
Helen Marston

Inventor
John J. Farrell
By his Attorney
A. P. Greeley

UNITED STATES PATENT OFFICE.

JOHN J. FARRELL, OF ARDMORE, PENNSYLVANIA, ASSIGNOR TO THE FARRELL COMPANY, OF WILMINGTON, DELAWARE, A CORPORATION OF DELAWARE.

MACHINE FOR ASSORTING AND COUNTING COINS.

1,095,981.  Specification of Letters Patent.  Patented May 5, 1914.

Application filed February 18, 1913. Serial No. 749,201.

*To all whom it may concern:*

Be it known that I, JOHN J. FARRELL, a citizen of the United States, residing at Ardmore, in the county of Montgomery, State of Pennsylvania, have invented certain new and useful Improvements in Machines for Assorting and Counting Coins, of which the following is a description, reference being had to the accompanying drawings, forming a part hereof.

My invention relates to machines for assorting coins, that is, for separating from a mass of coins including coins of more than one denomination, all of the coins of a particular denomination, so that they may be separately packaged or counted, or, counted and packaged; and, my invention has for its object to provide a machine adapted to receive the mass of coins, automatically separate out the coins of a particular denomination, and move the coins of the particular denomination one by one past a movable member connected with a counting mechanism, and then cause them to be discharged, and further adapted to simultaneously separate out the coins of all the different denominations present, count and discharge them.

With these and other objects hereinafter explained in view, my invention consists in the construction and combination of elements hereinafter described and particularly pointed out in the claims.

Figure 1:
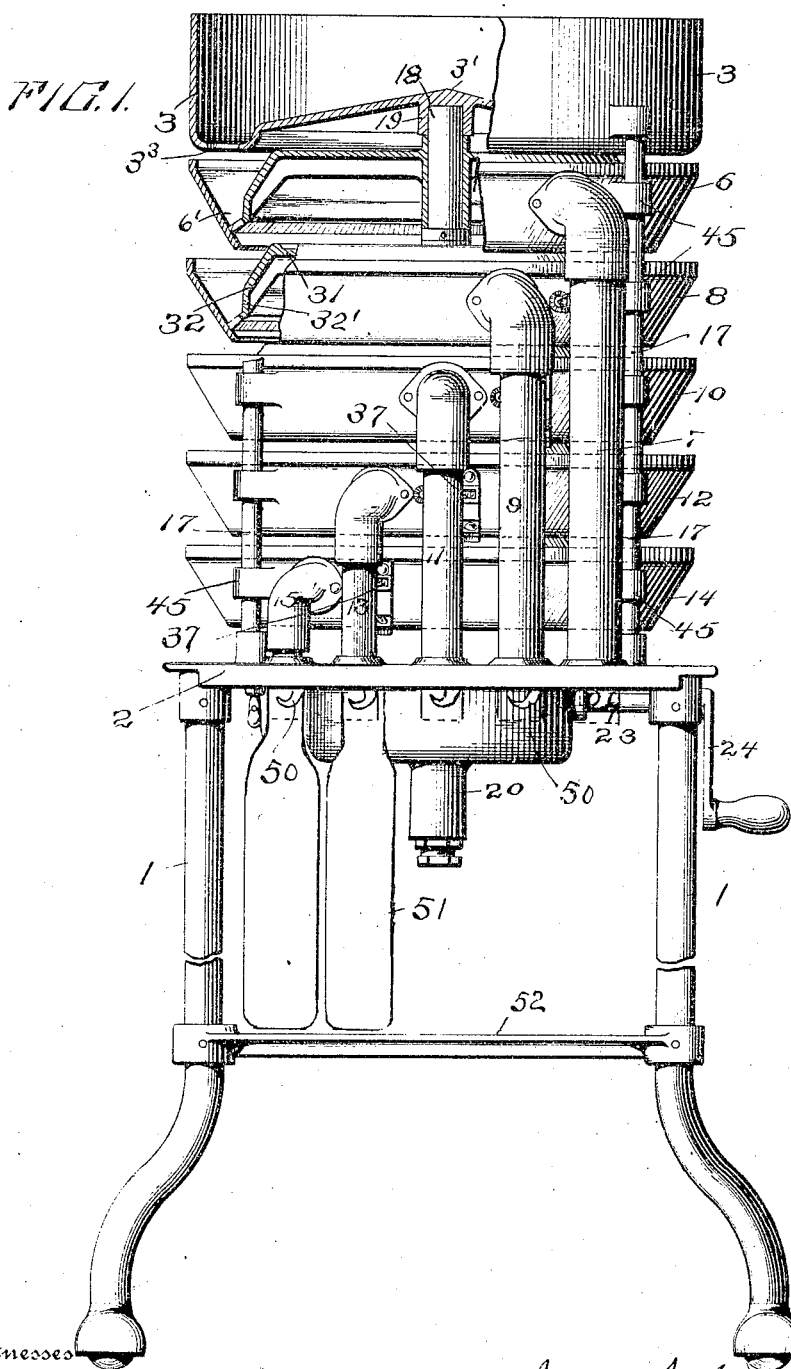
Figure 2:
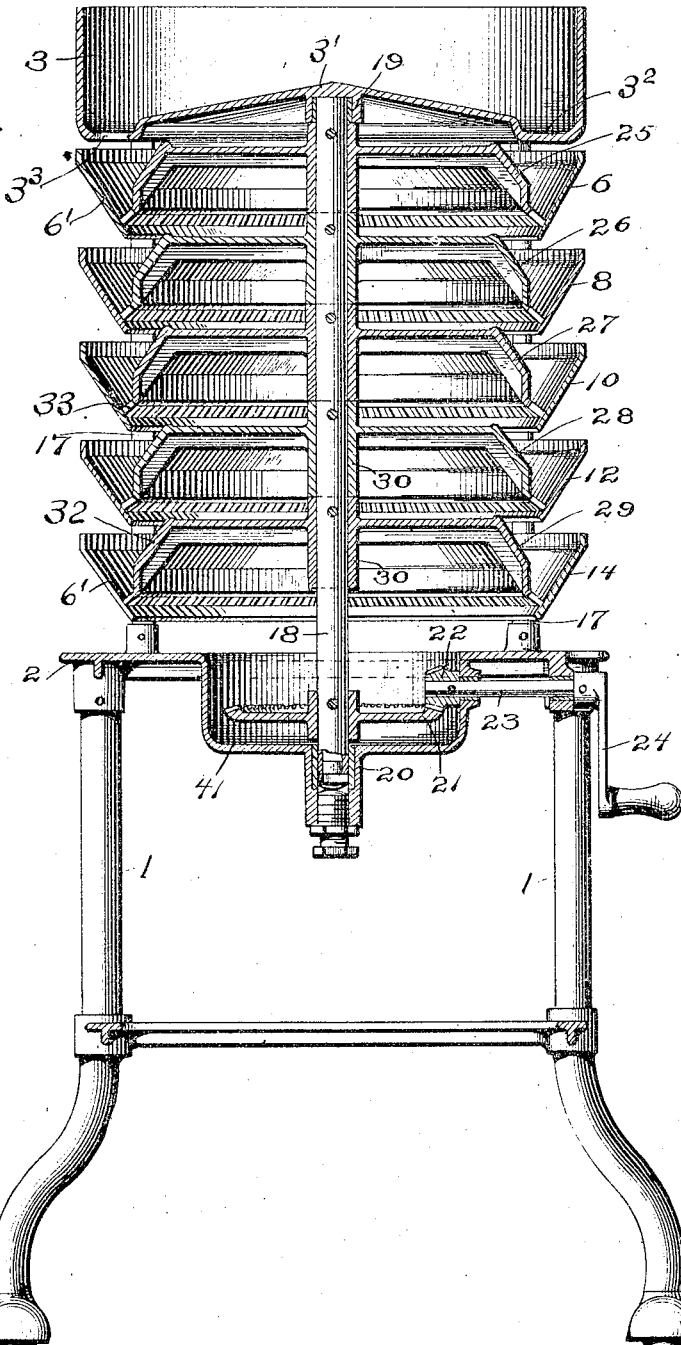
Figure 3:
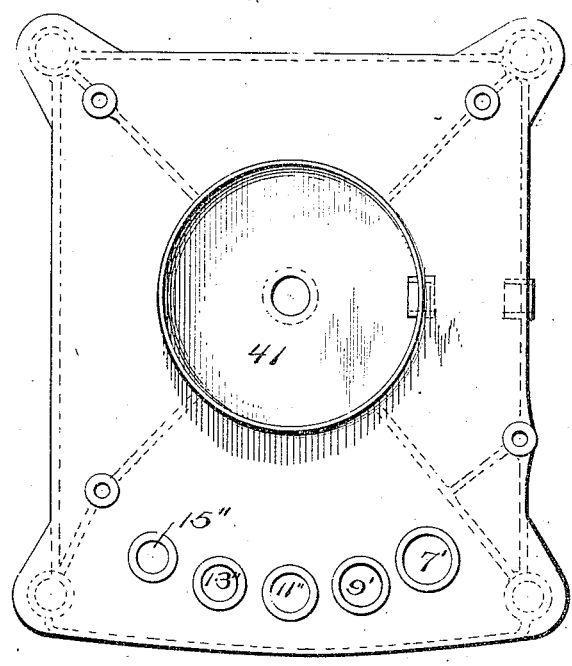
Figure 4:
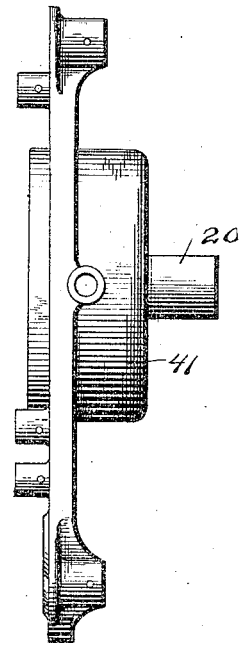
Figure 5:
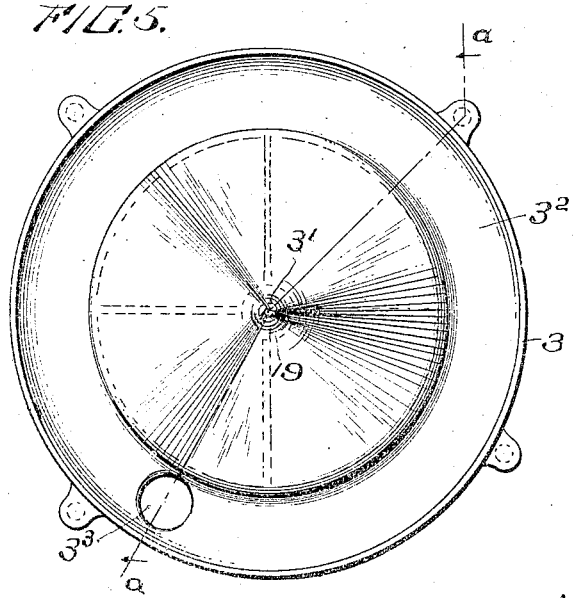
Figure 6:
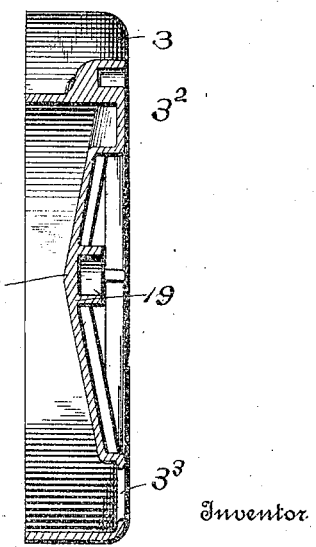
Figure 7:
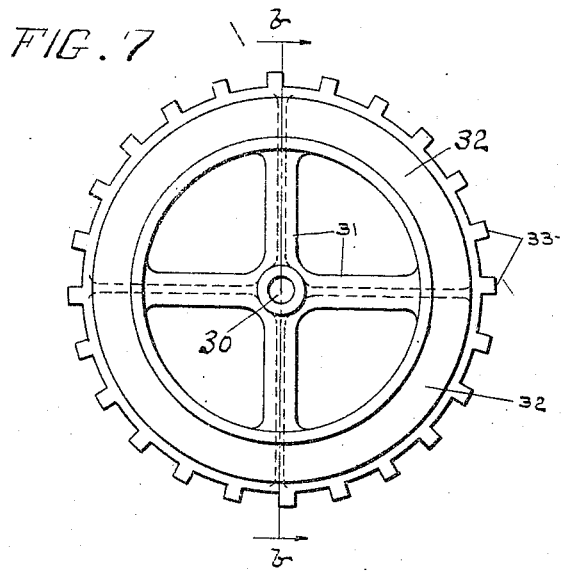
Figure 8:
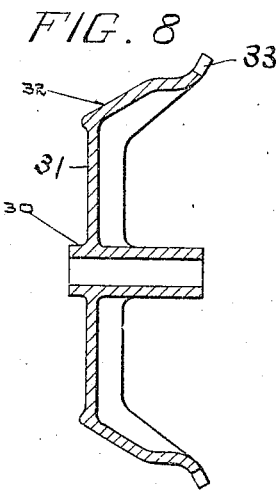
Figure 9:
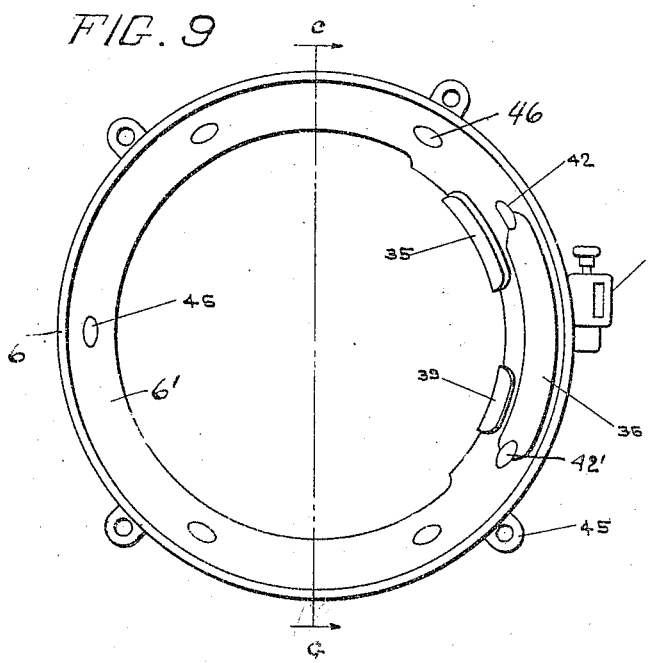
Figure 10:
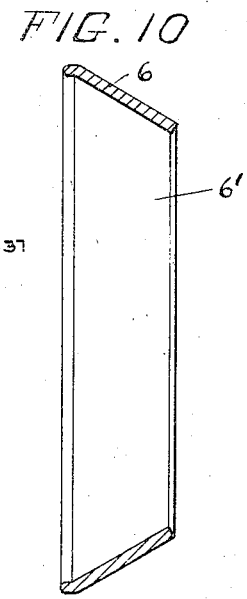
Figure 11:
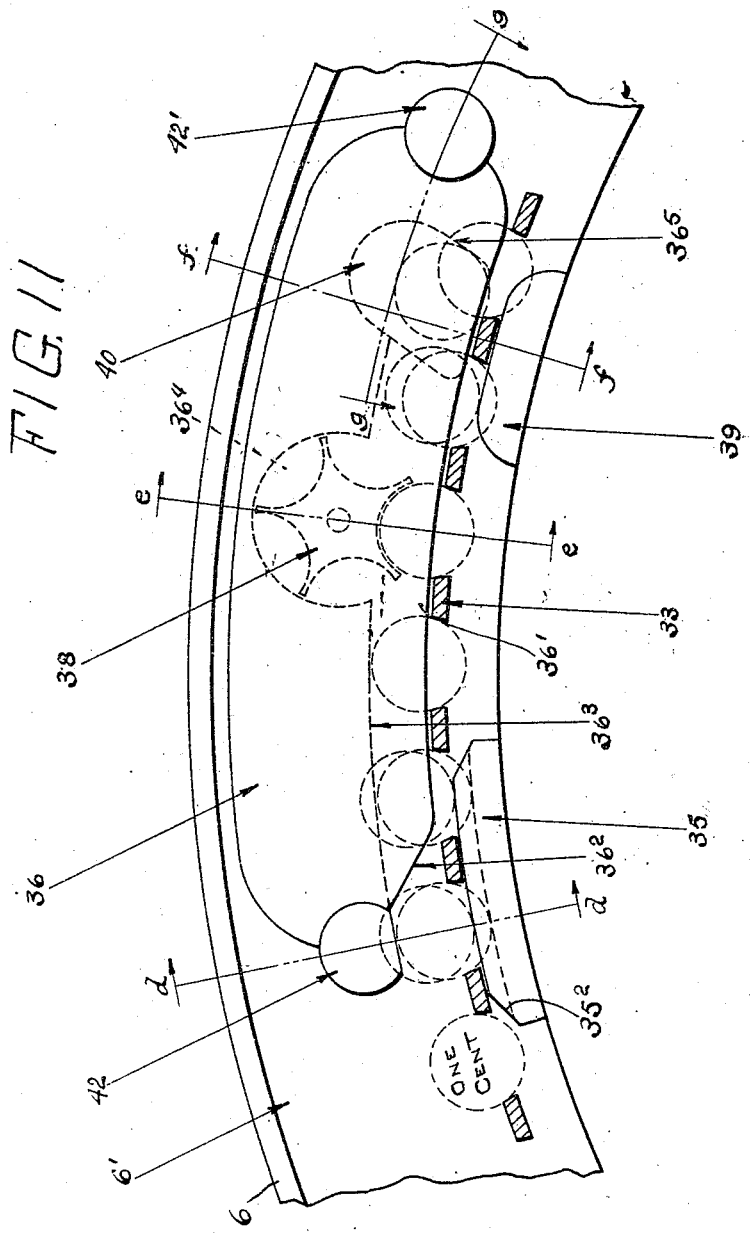
Figure 12:
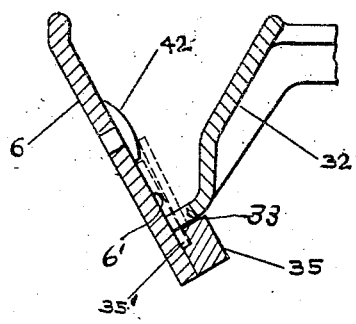
Figure 13:
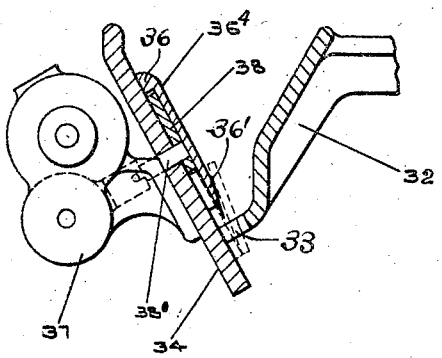
Figure 14:
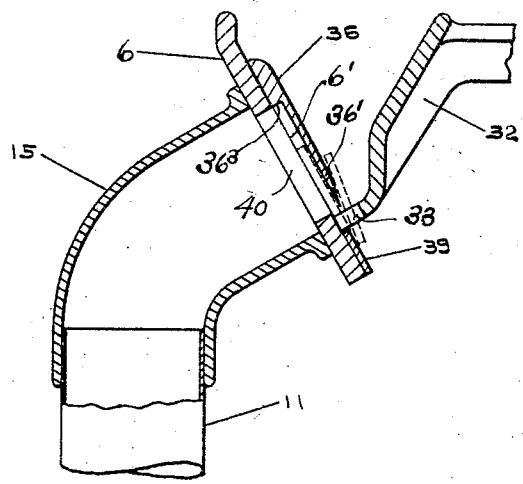
Figure 15:
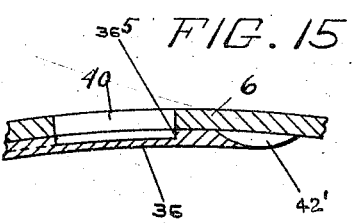

Referring to the drawings: Figure 1 is a front view in elevation of a machine embodying my invention. Fig. 2 is a vertical central sectional view of the machine. Fig. 3 is a top plan view of the bed plate of the machine. Fig. 4 is a side view of the bed plate in Fig. 3. Fig. 5 is a top plan view of the hopper in which the coins to be assorted are placed. Fig. 6 is a vertical sectional view on line $a$—$a$ of Fig. 5. Fig. 7 is a top plan view of one of the rotating or distributing members; and, Fig. 8 is a vertical sectional view of the same on line $b$—$b$ of Fig. 7. Fig. 9 is a top plan view of one of the stationary members in which the rotating member shown in Figs. 7 and 8 rotates; Fig. 10 is a vertical sectional view of the same on line $c$—$c$ of Fig. 9. Fig. 11 is a side view of a portion of the stationary member showing the devices by which the coins are so separated that only one at a time can act on the counting mechanism. Fig. 12 is a vertical sectional view on line $d$—$d$ of Fig. 11. Fig. 13 is a vertical sectional view on line $e$—$e$ of Fig. 11. Fig. 14 is a vertical sectional view on line $f$—$f$ of Fig. 11; and Fig. 15 is a horizontal sectional view on line $g$—$g$ of Fig. 11.

Referring to the drawings: 1 are legs or vertical supports carrying a bed or base plate 2 which in turn, by means of legs 17, supports a series of hoppers 6, 8, 10, 12 and 14, each comprising a stationary member and a rotating or distributing member as hereinafter described, and, also supports the receiving hopper 3 at the top of the machine. The central part 3' of the hopper is elevated so as to form a conical surface adapted to cause the coins to slide outward into an annular trough $3^2$ through which the coins drop into the assorting hopper 6 below it.

The assorting hopper 6 comprises an outer stationary annular member supported by the legs 17 having downwardly and inwardly inclined conical surface 6'. Within this stationary annular member is arranged a rotary member comprising a ring 32 having its outer surface inclined outwardly and downwardly as shown in Figs. 7 and 8, provided at its lower edge with radial outwardly inclined fingers 33, or as in Figs. 1 and 2 with a vertical surface 32' between the lower edge of the conical surface and the fingers 33. The ring 32 is carried by spokes 31 and at the center of the wheel is a sleeve 30 which fits upon and is secured to a vertical shaft 18 having a bearing 19 at its upper end in the under side of the receiving hopper 3, and a bearing 20 at its lower end in the depressed central portion 41 of the bed plate 2. Secured to this vertical shaft within the depressed portion 41 is bevel gear 21 which is in mesh with a bevel pinion 22 on a horizontal shaft 23 which is provided at its outer end with a crank 24 for operating it.

The construction of the parts of the hoppers 8, 10, 12 and 14 is the same as that of hopper 6, each comprising an outer stationary member with inwardly tapering walls and an inner rotary member having outwardly inclined outer surfaces arranged to be rotated by the shaft 18, the only difference between the several hoppers being in the spacing apart of the outwardly inclined radial fingers 33. These fingers are equally spaced apart on each rotary member but the spacing apart on the different rotary members differs to correspond with the diameters of the coins which are to be retained by the particular hopper until counted. For instance, if the machine is to be used in assorting coins of the denominations used in the United States, the spaces between the fingers 33 of the rotary member of hopper 6 would be sufficiently wide to permit all coins of less denomination than half dollars to pass through; the fingers 33 of the rotary member of hopper 8 would be so spaced apart as to permit the nickels, cents and dimes to pass through and retain the quarters; the fingers 33 of the rotary member of hopper 10 would be so spaced apart as to permit the cents and dimes to pass through and retain the nickels; the fingers 33 of the rotary member of hopper 12 would be so spaced apart as to permit only the dimes to pass through and retain the cents, and the fingers 33 of the hopper 14 are so spaced apart as to retain the dimes and cause them to be carried around as the rotary member is rotated.

The ends of the fingers 33 bear against the inclined surface 6' of the stationary member near its lower edge. The inclination of the inclined surface 6' is preferably about 60 degrees and that of the fingers 33 of the rotary member 32 is preferably such as to form a right angle with the inclined surface 6'.

As the several rotary members rotate they stir up by means of the fingers 33 whatever coins have fallen through from the receiving hopper or from any of the other hoppers. All of the coins which are of less diameter than the space between adjacent fingers 33 will drop through into the next lower hopper and the coins which are retained will so far drop into the spaces between adjacent fingers, as shown in Fig. 11 as to be engaged and carried forward as the rotary member continues its movement. By reason of the inclination of the surface 6' being greater than that of the fingers 33, and, to some extent by reason of centrifugal force when the rotary member is rotated at considerable speed, the coins will lie against the inclined surface 6' of the outer stationary member.

At some convenient point on the inclined surface 6' is an opening 40 of a size sufficient to permit the passage through it of a coin of the denomination retained by the particular hopper. Secured on the inclined surface 6' is a plate 36 the lower portion of which is cut away so as to form between it and the surface 6' a passageway adapted to receive a single coin. This lower portion of the plate 36 is beveled off at its lower edge to form a knife edge 36' and at its end toward which the coins are brought by the rotary member, that is the left hand end as shown on Fig. 11, it has an upwardly inclined knife edge. The passage way formed between the lower portion of the plate 36 and the inclined surface 6' is bounded on its upper edge by a shoulder 36³ which extends parallel with the upper edge of the stationary member 6 except that at 36⁴ the upper portion of plate 36 is cut away to form a recess to receive a star wheel 38, the shaft 38 of which extends outward through the stationary member 6 and is provided on its outer end with means for operating the shaft of a counting mechanism 37.

The passageway formed between the lower portion of plate 36 and the inclined surface 6' is terminated by a shoulder 36⁵ in line with the right hand edge of the opening 40. At the left hand end of the plate 36 is arranged a button shaped deflector 42 and a similar deflector 42' is preferably arranged at the right hand end of plate 36. The deflector 42 is cut away at its lower edge in line with the shoulder 36³ so as to permit a coin to pass beneath it.

Beneath the line of travel of the fingers 33 on the inclined surface 6' is secured a block 35 having a groove 35' formed on its inner upper portion of a width just sufficient to receive a single coin and having its bottom parallel with the line of the shoulder 36³. This block is arranged beneath the forward or left hand end of the plate 36, its forward or left hand end extending to the left of the left hand end of the plate 36 and being beveled off as shown in Fig. 11 at 35².

Immediately below the opening 40 is a lifting plate 39 secured against the inclined surface 6' with its upper edge in line with the line of travel of the under surface of the fingers 33. The lower edge of the opening 40 is so located with reference to the plane of the upper surface of the fingers 33 that as the coins ride up on the lifting plate 39 their centers will be considerably above the lower edge of the opening and they will consequently fall outward through the opening as they are brought against the abutment 36⁵.

The teeth 33 are of such length as to permit two or even more coins to be carried along lying one against another. At suitable intervals on the inclined surface 6' are arranged button shaped deflectors 46 similar to the deflectors 42 and 42'. As the coins are moved around by the fingers 33 these deflectors cause them to be pushed or thrown away from the surface 6', the deflectors thus serving to agitate the mass of coins and prevent their sticking together. By reason of this agitation and separation of the coins, the coins which are of less diameter than the space between adjacent fingers will be free to drop through into the next lower hopper.

Whenever two or more coins of the size which are to be counted in the particular hopper are lying one by the side of the other between two adjacent fingers 33 as they approach the plate 36 the one lying against the surface 6' will drop into the groove 35' of the block 35 and its upper edge will pass below the lower edge of the deflector 42 and into the passage way formed between the lower portion of the plate 36 and the surface 6' and will be carried forward into contact with the star wheel 38 causing the star wheel to rotate one step, and, of course, causing the counting mechanism 37 to register. The coin will then be carried along and caused to ride up on the lifting plate 39 and as it strikes the abutment 36⁵ will fall through opening 40. The other coin or coins owing to the groove 35' being only wide enough for one coin, will ride up on the upper surface of block 35 and by the action of the edge of the deflector 42 and knife edge 36² will separate these coins from the one which has its lower edge in the groove 35' and as they are carried forward by the fingers 33 they will be kept separated from the coin which is to be counted by the lower portion of plate 36. As soon as these coins pass the right hand end of plate 36 the one nearest the inclined surface 6' falls against it and on the completion of a rotation of the rotary member is carried into the groove 35' and so on into the passage-way behind the lower portion of plate 36 as previously described.

If in any way it should happen, which is not intended, that the rotary member is turned in the wrong direction any coins which may be between the fingers 33 to the right of plate 36 will be deflected by the deflector 42' so as not to strike the end of plate 36.

It will of course be understood that I do not desire to be limited to the particular construction and arrangement of parts shown and described, as it is obvious that many changes and modifications may be made without departing from the spirit of the invention.

Having thus described my invention what I claim is:

1. In a coin assorter the combination of an outer annular member having its sides inclined inward and an inner annular member having its sides inclined outward and having at its lower edge a series of fingers extending into contact with the outer member spaced apart a distance corresponding to but slightly less than the diameter of the coins to be retained.

2. In a coin assorter the combination of an outer annular member having its sides inclined inward and an inner annular member having its sides inclined outward and having at its lower edge a series of fingers extending into contact with the outer member spaced apart a distance corresponding to but slightly less than the diameter of the coins to be retained, and means for rotating the inner member.

3. In a coin assorter the combination of an outer annular member having its sides inclined inward and having a discharge opening formed therein and an inner annular member having its sides inclined outward and having at its lower edge a series of fingers extending into contact with the outer member spaced apart a distance corresponding to but slightly less than the diameter of the coins to be retained and means for rotating the inner member to carry the coins to the discharge opening.

4. In a coin assorter the combination of an outer annular member having its sides inclined inward and provided with a counting mechanism and an inner annular member having its sides inclined outward and having at its lower edge a series of fingers extending into contact with the outer member spaced apart a distance corresponding to but slightly less than the diameter of the coins to be retained, and means for rotating the inner member to carry the coins through the counting mechanism.

5. In a coin assorter the combination of a series of hoppers each comprising an outer annular member having its sides inclined inward and an inner annular member having its sides inclined outward and having at its lower edge a series of fingers extending into contact with the outer member spaced apart a distance corresponding to but slightly less than the diameter of the coins to be retained, arranged one above another, the spaces between the fingers of the inner members of the lower hoppers being less than that between the fingers of the upper hoppers.

6. In a coin assorter the combination of an outer annular member having its sides inclined inward and an inner annular member having its sides inclined outward and having at its lower edge a series of fingers extending into contact with the outer member spaced apart a distance corresponding to but slightly less than the diameter of the coins to be retained, means for rotating the inner member and a deflector arranged on the inner face of the outer member and adapted to cause the coins to be tipped inward.

7. In a coin assorter and counter a hopper comprising an annular outer member having its sides inclined inward and an inner rotary member having its sides inclined outward, a counting mechanism carried by the outer member comprising a star wheel, a plate secured to the inclined side of the outer member arranged to form therewith a passage way leading to the star wheel, and means carried by the inner rotary member arranged to move in a plane oblique to the plane of the passage way for forcing the coins through the passage way into contact with the star wheels.

8. In a coin assorter and counter a hopper comprising an annular outer member, having its sides inclined inward and an inner rotary member, having its sides inclined outward, a counting mechanism carried by the outer member comprising a star wheel, a plate secured to the inclined side of the outer member arranged to form therewith a passage way leading to the star wheel of a width equal to the thickness of a single coin and means carried by the rotary member arranged to move in a plane oblique to the plane of the passage way for forcing the coins through the passage way into contact with the star wheel.

9. In a coin assorter and counter a hopper comprising an annular outer member having its sides inclined inward and an inner rotary member having its sides inclined outward, a counting mechanism carried by the outer member comprising a star wheel, a plate secured to the outer member arranged to form therewith a passage way leading to the star wheel of a width equal to the thickness of a single coin the plates having a knife edge at the entrance to the passage way and means carried by the rotary member arranged to move in a plane oblique to the plane of the passage way for forcing the coins through the passage way into contact with the star wheel.

10. In a coin assorter and counter a hopper comprising an annular outer member having its sides inclined inward and an inner rotary member having its sides inclined outward, a counting mechanism carried by the outer member comprising a star wheel, a plate secured to the inclined sides of the outer member arranged to form therewith a passage way leading to the star wheel of a width equal to the thickness of a single coin, the plate having a knife edge at the entrance to the passage way, a block below the entrance to the passage way having formed therein adjacent to the outer member a groove of the width of the thickness of a single coin and means carried by the rotary member arranged to move in a plane oblique to the plane of the passage way for forcing the coins through the passage way into contact with the star wheel.

11. In a coin assorter and counter a hopper comprising an annular outer member having its sides inclined inward and an inner rotary member having its sides inclined outward, a counting mechanism carried by the outer member comprising a star wheel, a plate secured to the inclined sides of the outer member arranged to form therewith a passage way leading to the star wheel of a width equal to the thickness of a single coin, the plate having a knife edge at the entrance of the passage way, a block below the entrance to the passage way having formed therein adjacent to the outer member a groove of the width of the thickness of a single coin, and having its upper surface adapted to lift any coins other than the one in the groove of the block so that their upper edges will be deflected by the knife edge of the plate and means carried by the inner member for forcing coins through the passage way into contact with the star wheel.

12. In a coin assorter and counter, a hopper comprising an annular outer member having its inner surface inclined and having a discharge opening therein, a passageway leading to the discharge opening adapted to permit the passage of a coin therethrough, means for moving the coins through the passage-way and a lifting plate in the path of the coins so arranged as to cause each coin as it passes over it to be raised so that its center is above the lower edge of the discharge opening.

This specification signed and witnessed this fifteenth day of January, A. D. 1913.

JOHN J. FARRELL.

In the presence of—
WILLIAM W. RYON,
W. A. COULSTON.